June 26, 1934.  A. W. PHELPS ET AL  1,964,441
ARMATURE ASSEMBLING MACHINE
Filed March 29, 1933  10 Sheets-Sheet 6

Alva W. Phelps and
Lewis G. Malone
INVENTORS

BY Spencer Hardman & Fehr
their ATTORNEYS

June 26, 1934.  A. W. PHELPS ET AL  1,964,441
ARMATURE ASSEMBLING MACHINE
Filed March 29, 1933   10 Sheets-Sheet 8

Alva W. Phelps
and
Lewis G. Malone
INVENTORS

BY
Spencer Hardman & Fehr
their ATTORNEYS

June 26, 1934. A. W. PHELPS ET AL 1,964,441
ARMATURE ASSEMBLING MACHINE
Filed March 29, 1933 10 Sheets-Sheet 10

Alva W. Phelps and
Lewis G. Malone
INVENTORS

BY
Spencer Hardman & Fehr
their ATTORNEYS

Patented June 26, 1934

1,964,441

UNITED STATES PATENT OFFICE 1,964,441

ARMATURE ASSEMBLING MACHINE

Alva W. Phelps and Lewis G. Malone, Anderson, Ind., assignors, by mesne assignments, to General Motors Corporation, Detroit, Mich., a corporation of Delaware Application March 29, 1933, Serial No. 663,300

30 Claims. (Cl. 29—84)

This invention relates to the manufacture of armatures for dynamo electric machines and more particularly for armatures the windings or coils of which are preformed and afterwards assembled with the armature core.

In the manufacture of an armature of this type, the preformed coils are generally assembled with the armature core in the following manner: an active coil side of each coil is placed in the bottom of each core slot and the leads extending from that active coil side are attached to the proper segments of the commutator before the other active coil sides of the core are assembled in the outer portions of the armature core slots.

It is an object of the present invention to provide a machine which will receive the assembly of armature core and windings, one active coil side of each of which is located in an armature core slot, and which will simultaneously place the other active coil sides of all the coils in the proper armature core slot.

Further objects and advantages of the present invention will be apparent from the following description, reference being had to the accompanying drawings wherein a preferred embodiment of one form of the present invention is clearly shown.

In the drawings:

Fig. 14 is a view similar to Fig. 12 and is taken substantially on the line 14—14 of Fig. 5 or Fig. 5a.

Fig. 15 is a view similar to Fig. 14 and is taken on the line 15—15 of Figs. 6 or 6a.

Figure 16:
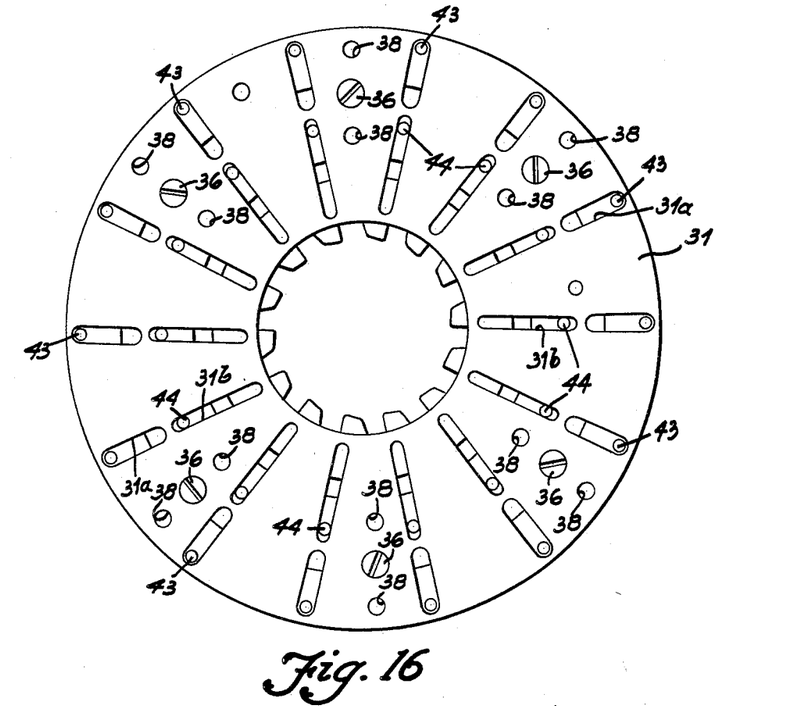
Fig. 16 is a side elevation of the assembly of coil positioning bars and coil inserting bars assembled with their supporting and guiding frame, this view being taken in the direction of arrow 16 of Fig. 7.

A base 20 supports bearing plates 21 and 22 having welded thereto supporting feet 23 and 24 respectively, attached by screws 25 and 26, respectively, to the base 20. The bearing plates 21 and 22 support annular cam plates 27 and 28 respectively, which in turn provide bearings respectively for annular cam plates 29 and 30 respectively. Thus the plates 27, 28 and 29, 30 are concentric and these plates are coaxial with a frame which comprises plates 31 and 32 journaled in bearings 21a and 22a, respectively, which are attached by screws 21b and 22b, respectively, to the plates 21 and 22 respectively. Plates 31 and 32 are secured together in spaced relation by means of radially extending bosses 34 having tapped holes 35 for receiving screws 36, (see Fig. 16), which pass through plain holes in the plate 31 and are threaded in to the tapped holes 35 of the bosses 34 and into aligned tapped holes in plate 32. Dowel pins 37 extend from the bosses 34 and are received by holes 38 in plate 31 and aligned holes in plate 32 so as to locate the plates 31 and 32 properly relative to each other. The plates 31 and 32 are provided with substantially radially extending grooves 39 and 40, respectively, for coil positioning bars 41 and coil inserting bars 42. Each of the bars 41 carries a pin 43 which extends beyond the sides thereof and projects through radial slots 31a in plates 31 and 32 and into cam slots 45 provided in the cam plates 27 and 28. Each of the coil inserting bars 42 is provided with a pin 44 extending beyond the sides thereof and projecting through radial slots 31b in plates 31 and 32, and into cam slots 46 provided in the plates 29 and 30. Since the frame comprising the plates 31 and 32 and the bars 41 and 42 assembled therewith are located between the cam plates 27, 29 and 28, 30, and are operatively connected therewith by the pins 43 and 44 which rest, respectively, on side surfaces conforming the slots 45 and 46, it is apparent that, when the frame and the positioning and inserting bars assembled therewith are rotated, the cam plates will rotate therewith unless stopped by other means.

Figures 7, 8:
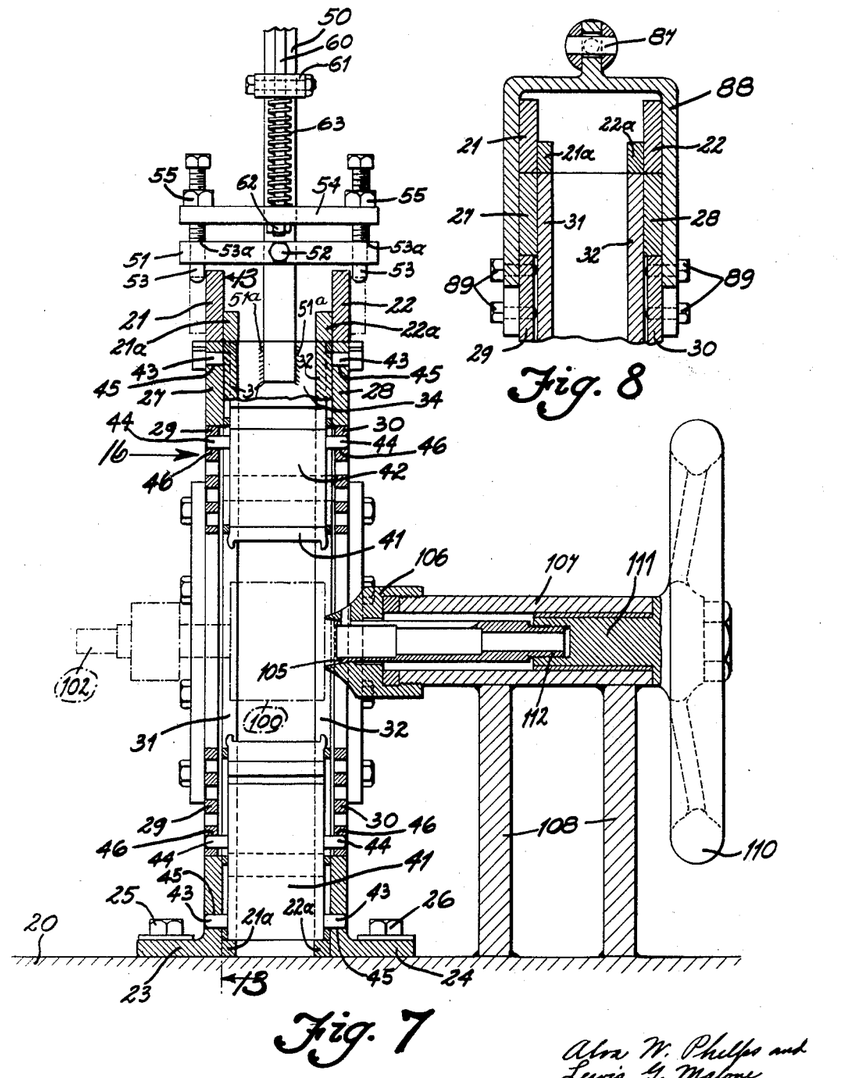
Fig. 7 is a vertical longitudinal sectional view of the machine, the section being taken generally on the line 7—7 of Fig. 1.
Fig. 8 is a fragmentary sectional view taken on the line 8—8 of Fig. 1.
Figures 9, 10, 11, 12:
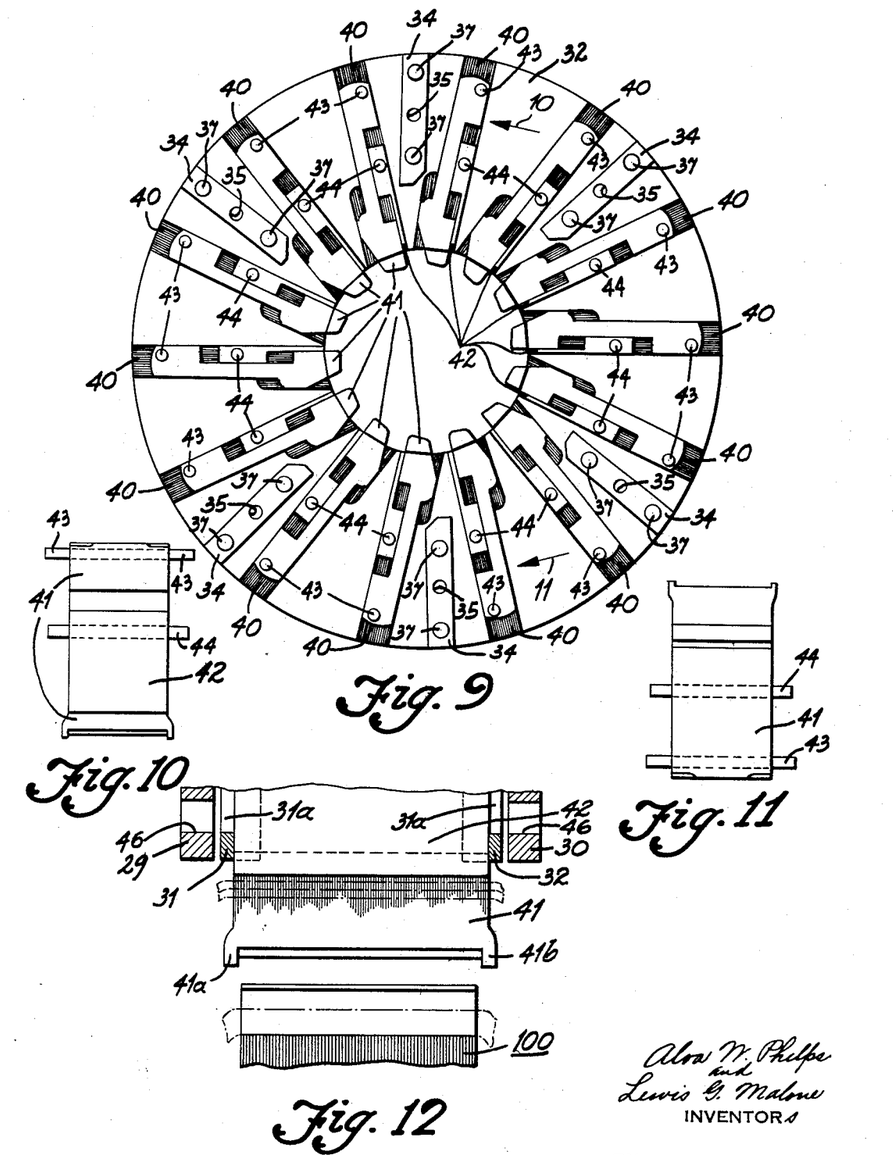
Fig. 9 is a plan view of the assembly of coil positioning bars and coil inserting bars together with their supporting and guide frame, one of the side plates of the frame being removed.
Fig. 10 is a view looking in the direction of arrow 10 of Fig. 9, showing an assembly of coil positioning bar and coil inserting bar.
Fig. 11 is a view looking in the direction of arrow 11 of Fig. 9 of an assembly of a coil positioning bar with a coil inserting bar.
Fig. 12 is a fragmentary sectional view taken substantially on the line 12—12 of Fig. 3.
Figure 13:
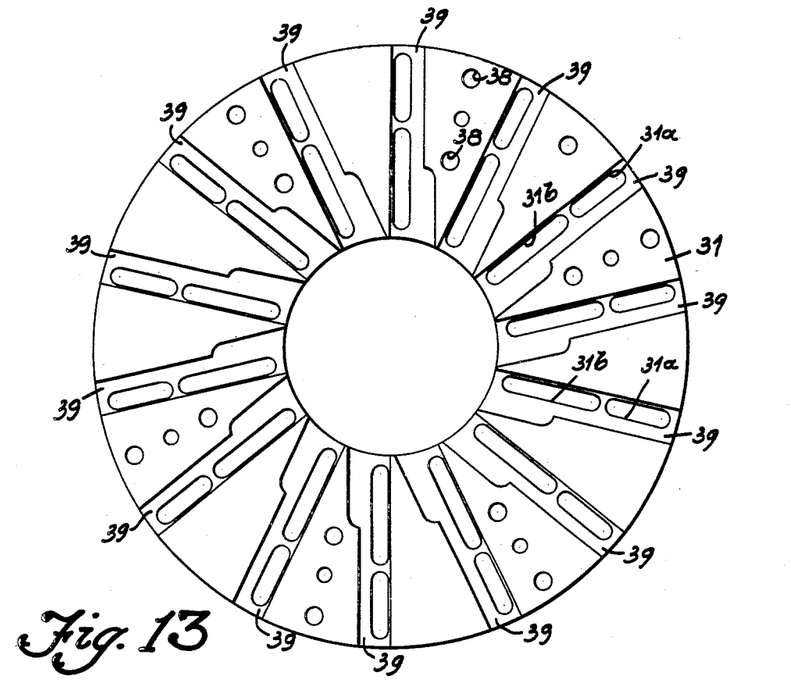
Fig. 13 is a plan view of the inside of one of the side plates of the bar supporting frame and is taken substantially on the line of and in the direction of the arrows of section line 13—13 of Fig. 7.

The means for rotating the frame which supports the coil positioning and coil inserting bars comprises a handle 50 attached by welding, as indicated at 51a in Fig. 7, to one of the spacing blocks 34. The handle 50 carries a cross bar 51 attached to the handle by a screw 52. The ends of the bar 51 are apertured so as to receive and guide the plain ends of screws 53 which are threaded through a cross bar 54 and are held in the desired position of adjustment by lock nuts 55. The cross bar 54 may be elevated by pushing a lever 56 toward the handle 50. The lever 56 is pivoted at 58 upon the handle 50 and is attached by a pin 59 to a link 60 which passes through a guide clip 61 and is connected at its lower end with a nut 62 which bears against the under side of the cross bar 54. A spring 63 located between the clip 61 and the cross bar 54 urges the latter downwardly until shoulders 53a of the screws 53 bear against the cross bar 51. Thus it is seen that the spring 63 normally urges the lower end of the screws 63 into such a position that they will be operative to engage the surfaces 64 of a pair of stop levers 65 pivoted at 66 to the frames 21 and 22, respectively, or operative to engage the surfaces 67 of a pair of stop levers 68 pivoted at 69 upon said frames 21 and 22. The stop levers 65 and 68 have hooked ends 70 and 71, respectively, each adapted to be engaged by a stop block 72, one of said blocks being attached as shown to the cam plate 27 and another stop block 72 to the cam plate 28. In the normal position of the machine the stop blocks each engage a stop block 74, one of said blocks 74 being attached to frame 21 and the other to the frame 22. Under certain conditions the stop block 72 is free to move between the stop blocks 74 and other stop blocks 75, one stop block 75 being attached to the frame 21 and another stop block 75 to the frame 22. In the manner to be described, these levers 65 and 68 are operative to lock the plates 27 and 28 to the frames 21 and 22 but they are released under certain conditions.

The cam plates 29 and 30 may be rotated relative to the remainder of the assembly by pushing downwardly a pedal 80 pivoted at 81 and carrying a stud or pin 82 engageable in the fork 83 of a lever 84 which is pivoted at 85 and is connected by a cable 86 at 87 with a yoke 88 each side of which is secured by screws 89 to one of the cam plates 29 and 30.

The armature core 100, in each of the slots of which has previously been placed an active coil side of a coil 101, is inserted into the space between the ends of the positioning bars 41 and is supported centrally of this opening by the shaft 102 of the armature which is held nonrotatably in a collet chuck comprising an inner member 105 and an outer member 106. The outer member 106 is fastened to a sleeve 107 (see Fig. 7), which is supported by pedestal plates 108 which are welded to the sleeve 107 and to the base 20. The inner member 105 is forced against the outer member 106, in order to force the jaws of the inner member 105 against the armature shaft, by the turning of a hand wheel 110 attached to a rod 111 which threadedly engages the threaded end 112 of the inner member 105. The armature to be assembled having been properly positioned within the space surrounded by the ends of the bars 41 and each free active coil side (one not yet placed in a core slot) having been located in a space between adjacent bars 41, the machine is now ready to be operated.

The operator who stands to the right of the machine as viewed in Figs. 1 to 6 pulls the handle 50 toward him, thereby causing the plates 27 and 28 to be rotated until the stops 72 engage the stop hooks 70 of the levers 65, whereupon further movement of the plates 27 and 28 will be arrested. The operator continues to pull the handle 50 whereupon the bars 41 will move from the position shown in Fig. 1 to that shown in Fig. 2 due to the camming action between the side surfaces of the slots 45 and the pins 43. This action continues until the lower ends of the screws 53 engage the levers 65, and cause them to move into the position shown in full lines in Fig. 2 thereby causing the hooked ends 70 of said levers 65 to release the stop block 72. Thus the cam plates 27 and 28 are free again to turn when the handle 50 is pulled still further toward the operator. Two of the bars 41 have been marked A and B respectively, in order that their various positions may be noted as the operation of the machine progresses. It will be noted that the inner ends of the bars 41 have been brought closer together by the operation of the machine from the position shown in Fig. 1 to that shown in Fig. 2 thereby narrowing the space which receives the unplaced active coil sides between the bars 41. During the movement of the handle from the position shown in Fig. 2 to that shown in Fig. 3 the bars 41 also move clockwise pulling the unplaced active coil sides in the same direction toward the armature core slots into which they are to be inserted later. The movement from the position shown in Fig. 2 to that shown in Fig. 3 takes place until the hooked ends 71 of the levers 68 are engaged by the plate 72 and then motion of the plates 27 and 28 in unison with the handle 50 is arrested. During movement of the handle 50 from the position shown in Fig. 3 to that shown in Fig. 4 the plates 27 and 28 remain stationary, thereby causing the bars 41 to move inwardly due to the camming action between the side surfaces of slots 45 and the pins 43. The bars 41 are now in their closest relation to the armature core and the space between them has still further diminished thereby causing each of the active coil sides which is oblong in cross section, to be squeezed into such thickness that it may be introduced into the core slot at the proper time.

Figure 1:
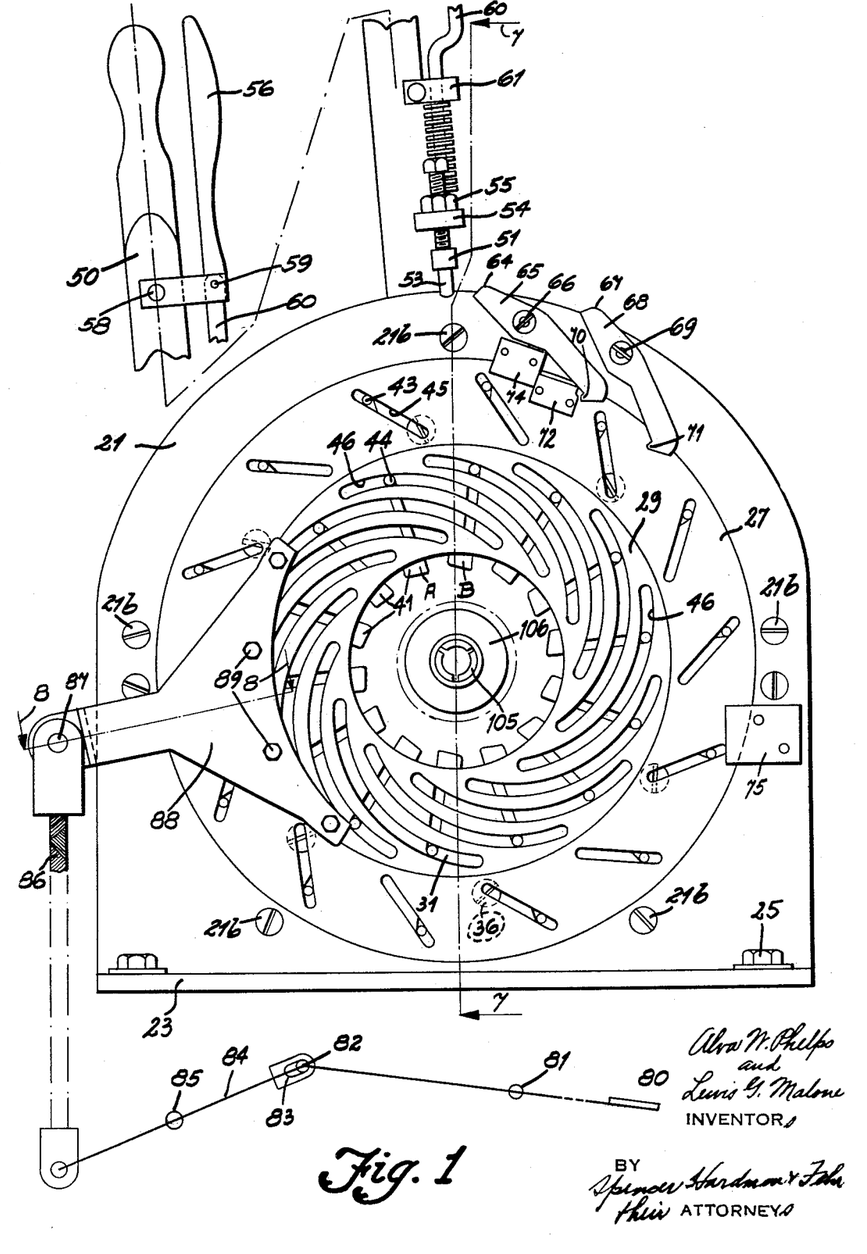
Fig. 1 is a side elevation of the machine in its initial or normal position.
Figure 2:
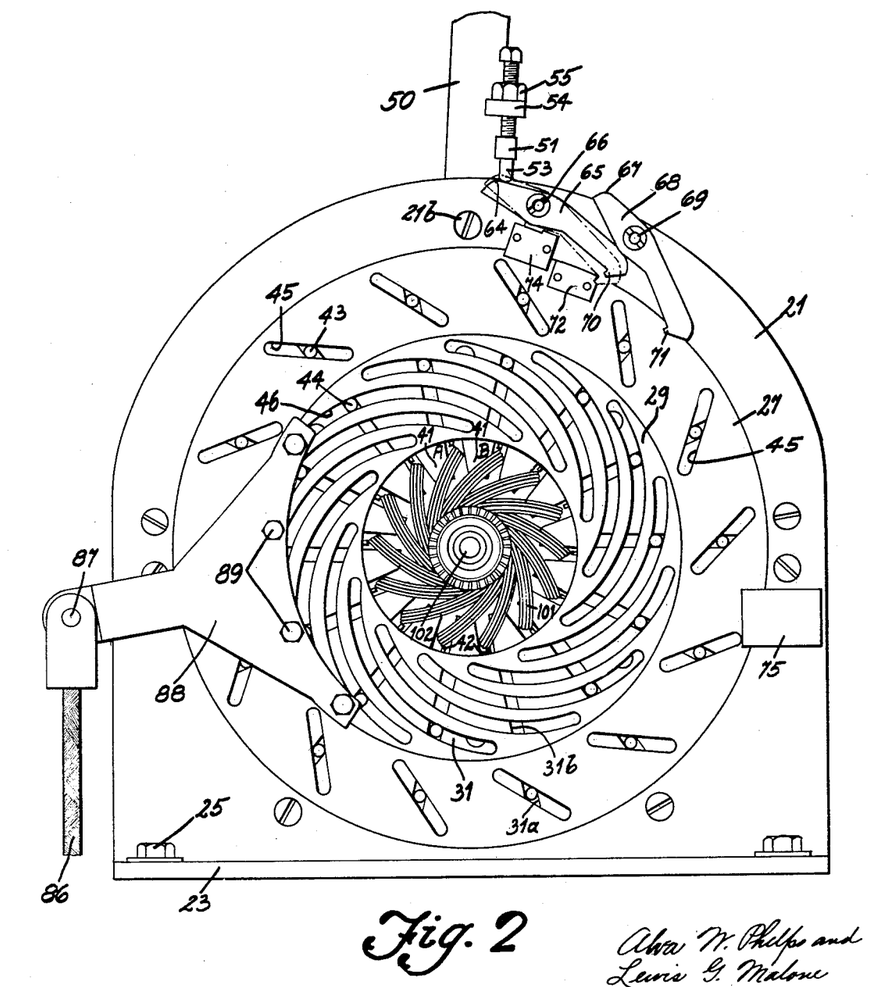
Figs. 2 to 6 inclusive are views similar to Fig. 1 showing the machine in various positions of operation.
Figure 3:
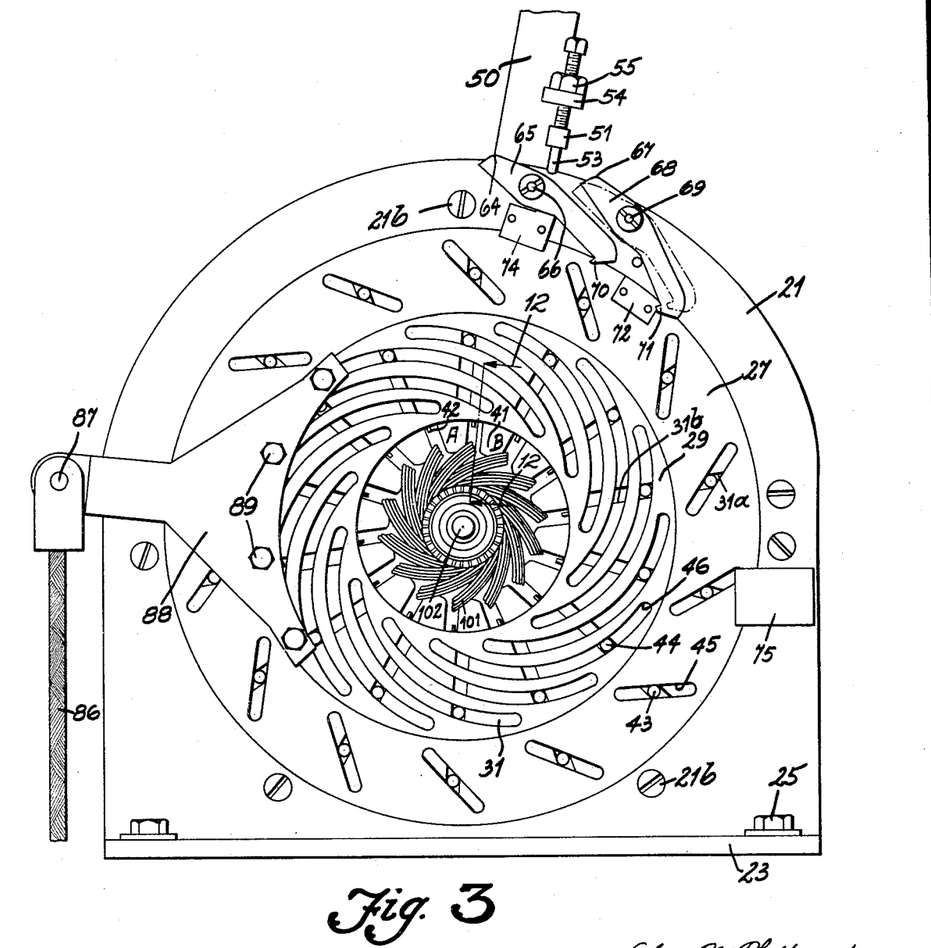
Figure 4:
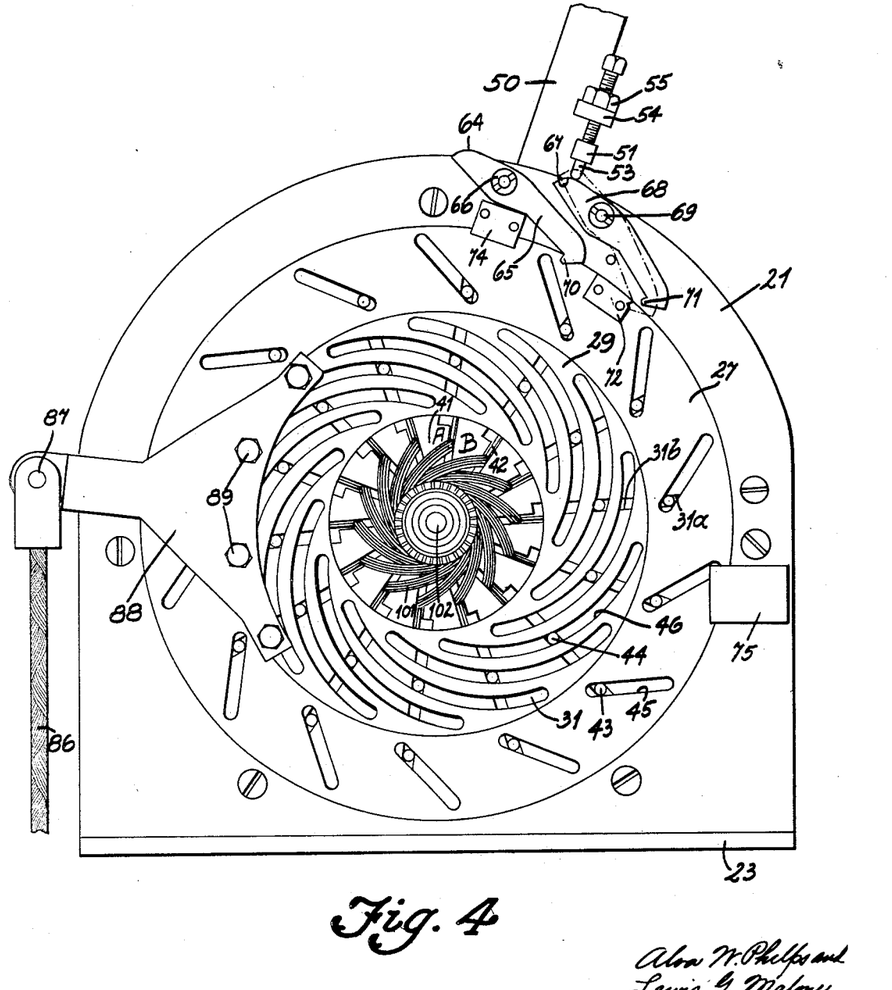
Figures 5, 5A:
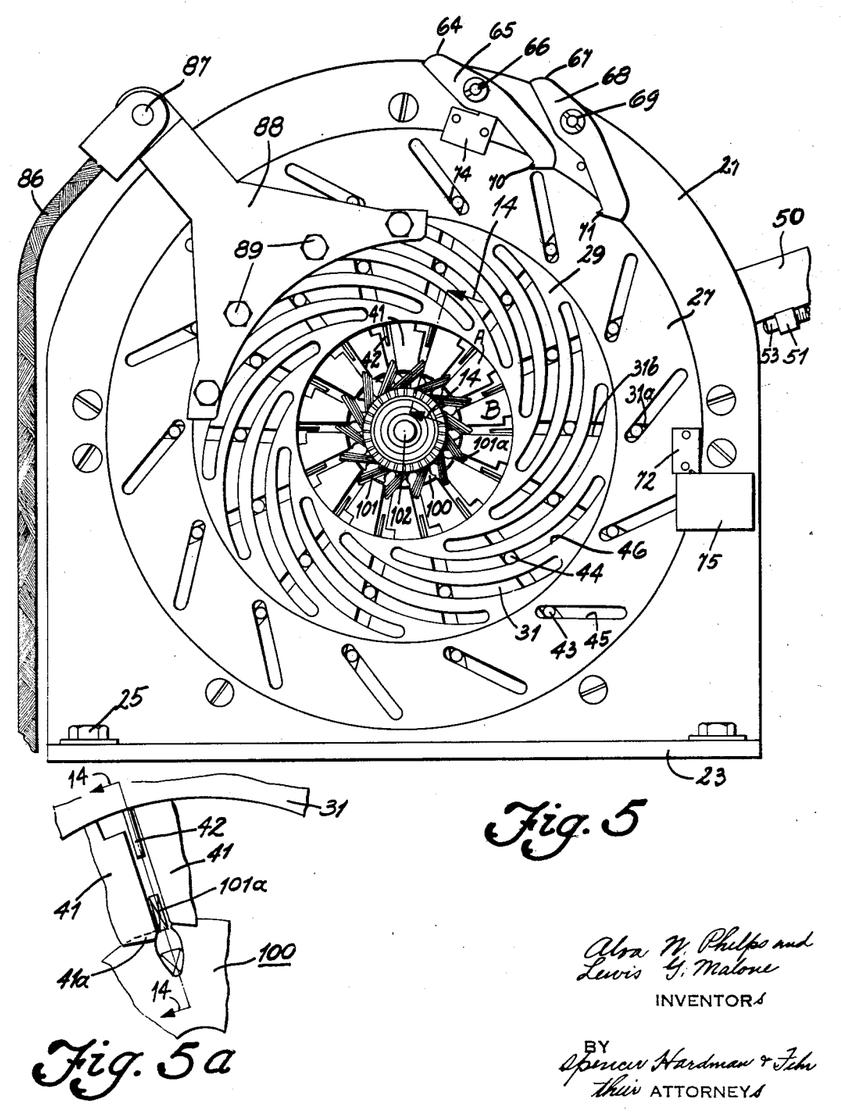
Figs. 5a and 6a are fragmentary views on an enlarged scale showing portions of the machine as they appear in Figs. 5 and 6 respectively.

The free active coil sides are properly squeezed in the position of the bars 41 shown in Fig. 4, but they are not yet in alignment with their proper core slots into which they are to be introduced. Movement of the handle 50 into the position shown in Fig. 4 has caused the screws 53 to engage the levers 68 so as to release them from the blocks 72 so that thereafter the cam plates 27 and 28 may rotate with the handle 50. Rotation of the handle 50 continues until the block 72 strikes the block 75 as shown in Fig. 5. During the rotation of the handle in this manner from the position shown in Fig. 4 to that shown in Fig. 5 the locating bars 41 have pulled the free active coil sides in a clockwise direction so as to locate these coil sides in alignment with their proper core slots which are intended to receive them.

Figure 14:
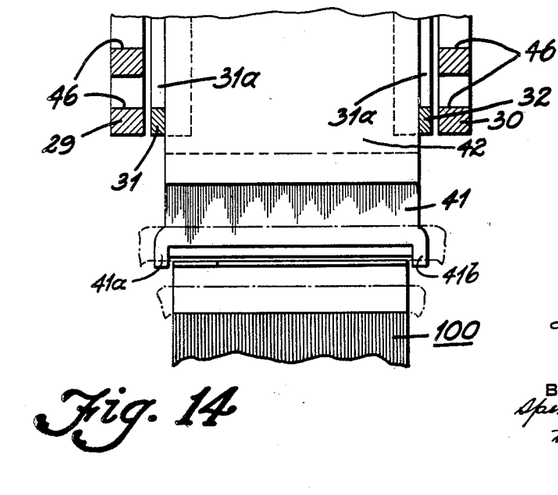
Figure 15:
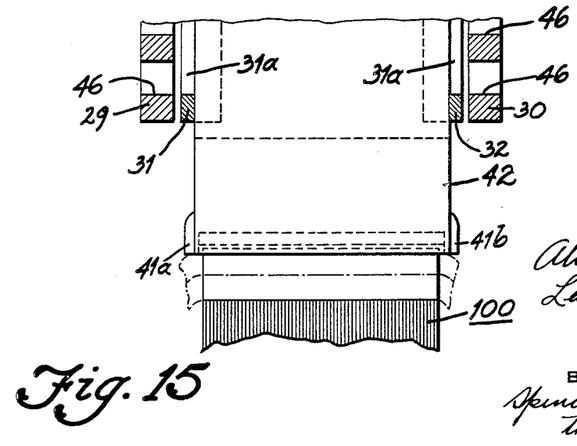

By referring to Fig. 14 which corresponds to Fig. 5 it will be noted that the bars 41 are provided with side flanges 41a and 41b which extend beyond the end edges of the armature core 100 so as to prevent unplaced active coil sides from sliding over the corners of the core teeth while being inserted into the core slots.

Figures 6, 6A:
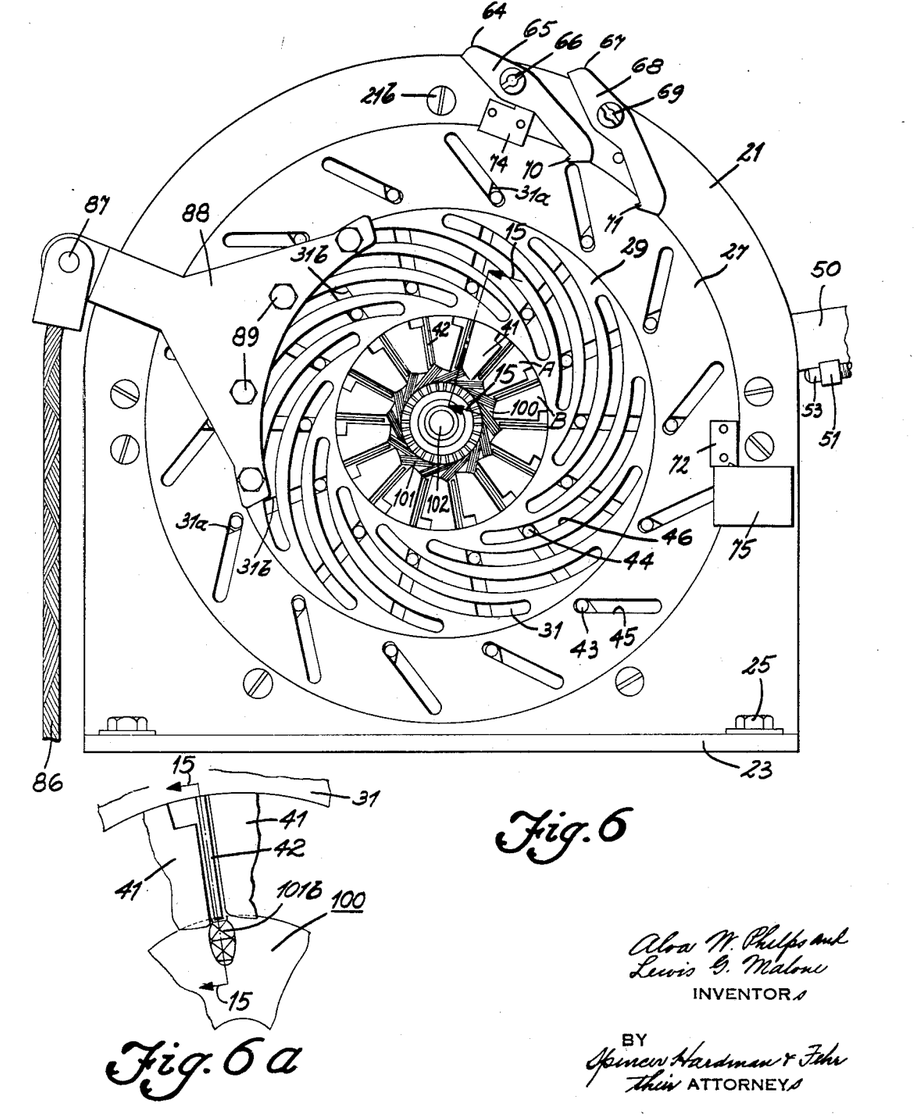

While the operator holds the handle 50 in the position shown in Fig. 5 he presses down on the pedal 80, which meanwhile has been moved upwardly due to clockwise rotation of handle 50, thereby causing the yoke 88 to move counter clockwise from the position shown in Fig. 5 to that shown in Fig. 6. This action causes the inserting bars 42 to move inwardly from the position shown in Fig. 5a to that in Fig. 6 due to the cooperation between the cam slots 46 and the pins 44, thereby causing the free unplaced active coil sides shown at 101a in Fig. 5a to move into the core slots into the position shown at 101b in Fig. 6a.

Before the assembled armature can be removed from the machine the handle 50 is moved counter clockwise until the block 72 strikes the block 74 thereby restoring the parts to normal position due to reversal of camming action between pins 44 and slots 46 and reversal of camming action between pins 43 and slots 45.

While the form of embodiment of the present invention as herein disclosed, constitutes a preferred form, it is to be understood that other forms might be adopted, all coming within the scope of the claims which follow.

What is claimed is as follows:

1. A machine for assembling armatures for dynamo electric machines comprising, in combination, means for holding an assembly including a slotted armature core and a plurality of armature coils, one active coil side of each having been positioned in a core slot and the other active coil side of each being free; and means for simultaneously inserting the free active sides of said coils into core slots in a direction transversely of the core axis.

2. A machine for assembling armatures for dynamo electric machines comprising, in combination, means for holding an assembly including a slotted armature core and a plurality of armature coils, one active coil side of each having been positioned in a core slot and the other active coil side of each being free; means for simultaneously positioning the free active sides of said coils for insertion into core slots; and means for simultaneously inserting said coil sides into core slots in a direction transversely of the core axis.

3. A machine for assembling armatures for dynamo electric machines comprising, in combination, means for holding an assembly including a slotted armature core and a plurality of armature coils, one active coil side of each having been positioned in a core slot and the other active coil side of each being free; means for simultaneously displacing the free sides of said coils angularly relative to the core and for aligning said coil sides with the core slots; and means for simultaneously inserting said coil sides into core slots.

4. A machine for assembling armatures for dynamo electric machines comprising, in combination, means for holding an assembly including a slotted armature core and a plurality of armature coils, one active coil side of each having been positioned in a core slot and the other active coil side of each being free; means for simultaneously displacing the free active sides of said coils angularly relative to the core and for aligning said coil sides with the core slots and for locating said coil sides for insertion substantially radially into the core slots; and means for simultaneously inserting said coil sides into core slots.

5. A machine for assembling armatures for dynamo electric machines comprising, in combination, means for holding a slotted armature core; a frame; a plurality of angularly spaced bars mounted on the frame for movement toward or away from each other, each space between adjacent bars receiving an active side of an armature coil; means for simultaneously moving adjacent bars toward each other in order to squeeze the coil sides between the bars; and means for simultaneously ejecting the squeezed coil sides from the mentioned spaces into core slots.

6. A machine for assembling armatures for dynamo electric machines comprising, in combination, means for holding a slotted armature core; a frame; angularly spaced bars mounted on the frame for movement toward or away from the core, each space between adjacent bars receiving an active side of an armature coil; means for simultaneously moving all bars toward the core in order to narrow the spaces between them and squeeze the coil sides therein; and means for simultaneously ejecting the squeezed coil sides from the mentioned spaces into core slots.

7. A machine for assembling armatures for dynamo electric machines comprising, in combination, means for holding a slotted armature core; a frame; angularly spaced bars mounted on the frame for movement radially of the core axis, each space between adjacent bars receiving an active side of an armature coil; means for simultaneously moving all bars toward the core in order to narrow the spaces between them and squeeze the coil sides therein; and means for simultaneously ejecting the squeezed coil sides from the mentioned spaces into core slots.

8. A machine for assembling armatures for dynamo electric machines comprising, in combination, means for holding a slotted armature core; a frame; a plurality of angularly spaced bars mounted on the frame for movement toward or away from each other, each space between adjacent bars receiving the free active side of a coil; means causing the bars simultaneously to move toward each other to squeeze the coil sides between the bars and to align the squeezed coil sides with their respective core slots upon relative rotation between said means and the frame; and means for simultaneously ejecting the squeezed coil sides from the mentioned spaces into the aligned core slots.

9. A machine for assembling armatures for dynamo electric machines comprising, in combination, means for holding a slotted armature core; a frame; a plurality of angularly spaced bars mounted on the frame for movement toward or away from each other, each space between adjacent bars receiving the free active side of a coil; a plurality of means causing the bars simultaneously to move toward each other to squeeze the coil sides between the bars, to align the squeezed coil sides with their respective core slots and to eject the squeezed coil sides from the mentioned spaces into the aligned core slots in response to relative rotation between said means and the frame.

10. A machine for assembling armatures for dynamo electric machines comprising, in combination, means for holding a slotted armature core; a frame; a plurality of angularly spaced bars mounted on the frame for movement toward or away from each other, each space between adjacent bars receiving the free active side of a coil; means responsive to relative rotation between said means and the frame in a certain direction successively to move the bars simultaneously a predetermined distance toward each other, simultaneously to displace the bars angularly with respect to the core, simultaneously to move the bars further toward each other so as to squeeze the coil sides therebetween into proper thickness for insertion through the core slot entrances and simultaneously to further displace the bars angularly with respect to the core until the squeezed coil sides are in proper alignment with their respective core slots; and means for simultaneously ejecting all squeezed coil sides from the mentioned spaces into the aligned core slots.

11. A machine for assembling armatures for dynamo electric machines comprising, in combination, means for holding a slotted armature core; a frame; a plurality of angularly spaced bars mounted on the frame for movement toward or away from each other, each space between adjacent bars receiving the free active side of a coil; means responsive to rotation of the frame in a certain direction successively to move the bars simultaneously a predetermined distance toward each other, simultaneously to displace the bars angularly with respect to the core, simultaneously to move the bars further toward each other so as to squeeze the coil sides therebetween into proper thickness for insertion through the core slot entrances and simultaneously to further displace the bars angularly with respect to the core until the squeezed coil sides are in proper alignment with their respective core slots; and means for simultaneously ejecting all squeezed coil sides from the mentioned spaces into the aligned core slots.

12. A machine for assembling armatures for dynamo electric machines comprising, in combination, means for holding a slotted armature core; a frame; a plurality of angularly spaced bars mounted on the frame for movement radially of the core axis, each space between adjacent bars receiving the free active side of a coil; means responsive to relative rotation between said means and the frame in a certain direction successively to move the bars simultaneously a predetermined distance toward the core whereby the space between adjacent bars becomes narrower, simultaneously to displace the bars angularly with respect to the core, simultaneously to move the bars further adjacent the core periphery so as to squeeze the coil sides therebetween into proper thickness for insertion through the core slot entrances and simultaneously to further displace the bars angularly with respect to the core until the squeezed coil sides are in proper alignment with their respective core slots; and means for simultaneously ejecting all squeezed coil sides from the mentioned spaces into the aligned core slots.

13. A machine for assembling armatures for dynamo electric machines comprising, in combination, means for holding an assembly including a slotted armature core and a plurality of armature coils, one active side of each having been positioned in a core slot and the other active coil side of each being free; a rotatable frame; a plurality of angularly spaced bars mounted on the frame for movement toward or away from each other, each space between adjacent bars receiving the free active side of a coil; means for simultaneously moving adjacent bars toward each other in order to squeeze the coil sides between the bars; means for rotating the frame relative to the core in order simultaneously to displace the free active coil sides angularly relative to the core and to align the same with the core slots; and means for simultaneously ejecting the squeezed coil sides from the mentioned spaces into the aligned core slots.

14. A machine for assembling armatures for dynamo electric machines comprising, in combination, means for holding an assembly including a slotted armature core and a plurality of armature coils, one active side of each having been positioned in a core slot and the other active coil side of each being free; a rotatable frame; a plurality of angularly spaced bars mounted on the frame for movement radially of the core axis, each space between adjacent bars receiving the free active side of a coil; means for simultaneously moving all bars toward the core in order to narrow the spaces between them and squeeze the coil sides therein; means for rotating the frame relative to the core in order simultaneously to displace the free active coil sides angularly relative to the core and to align the same with the core slots; and means for simultaneously ejecting the squeezed coil sides from the mentioned spaces into the aligned core slots.

15. A machine for assembling armatures for dynamo electric machines comprising, in combination, means for holding an assembly including a slotted armature core and a plurality of armature coils, one active side of each having been positioned in a core slot and the other active coil side of each being free; a rotatable frame; a plurality of angularly spaced bars mounted on the frame for movement radially of the core axis, each space between adjacent bars receiving the free active side of a coil, a plate having a plurality of cam slots cooperating with the bars to move the latter toward the core upon rotation of the frame in a certain direction relative to said plate whereby the spaces between the bars become narrower and the coil sides therein are squeezed; means for rotating the frame in said certain direction relative to the plate in order simultaneously to displace the free active coil sides angularly relative to the core and to align the same with the core slots; and means for simultaneously ejecting all squeezed coil sides from the mentioned spaces into the aligned core slots.

16. A machine for assembling armatures for dynamo electric machines comprising, in combination, means for holding an assembly including a slotted armature core and a plurality of armature coils, one active side of each having been positioned in a core slot and the other active coil side of each being free; a rotatable frame; a plurality of angularly spaced bars mounted on the frame from movement radially of the core axis, each space between adjacent bars receiving the free active side of a coil; a plate rotatable concentrically of the frame and having a plurality of cam slots cooperating with the bars to move the latter toward the core upon rotation of the frame through a predetermined cycle in a certain direction relative to the plate whereby the spaces between the bars become narrower and the coil sides therein are squeezed; means for rotating the frame in said certain direction relative to the plate in order simultaneously to displace all free active coil sides angularly relative to the core and to align the same with the core slots; means arresting the plate during rotation of the frame through said predetermined cycle and in said certain direction only; and means for simultaneously ejecting the squeezed coil sides from the mentioned spaces into the aligned core slots.

17. A machine for assembling armatures for dynamo electric machines comprising, in combination, means for holding a slotted armature core; a frame; a plurality of angularly spaced bars mounted on the frame for movement toward or away from each other, each space between adjacent bars receiving an active side of an armature coil; means for simultaneously moving adjacent bars toward each other in order to squeeze the coil sides between the bars; a plurality of bars mounted on the frame alternately intermediate the first mentioned bars for movement radially of the core axis; and means for simultaneously moving all of the last mentioned bars toward the core in order to eject the squeezed coil sides from the mentioned spaces into core slots.

18. A machine for assembling armatures for dynamo electric machines comprising, in combination, means for holding a slotted armature core; a frame; a plurality of angularly spaced bars mounted on the frame for movement toward or away from each other, each space between adjacent bars receiving an active side of an armature coil; means for simultaneously moving adjacent bars toward each other in order to squeeze the coil sides between the bars; a plurality of bars mounted on the frame alternately intermediate the first mentioned bars for movement radialy of the core axis; and a rotatable plate having a plurality of cam slots cooperating with the last mentioned bars for simultaneously moving the latter toward the core upon rotation of said plate relative to the frame in order to eject the squeezed coil sides from the mentioned spaces into core slots.

19. A machine for assembling armatures for dynamo electric machines comprising, in combination, means for holding a slotted armature core; a frame; angularly spaced bars mounted on the frame for movement radially of the core axis, each space between adjacent bars receiving an active side of an armature coil; means for simultaneously moving all bars toward the core in order to narrow the spaces between them and squeeze the coil sides therein; a plurality of bars mounted on the frame alternately intermediate the first mentioned bars for movement radially of the core axis; and means for simultaneously moving all of the last mentioned bars toward the core in order to eject the squeezed coil sides from the mentioned spaces into core slots.

20. A machine for assembling armatures for dynamo electric machines comprising, in combination, means for holding a slotted armature core; a frame; a plurality of angularly spaced bars mounted on the frame for movement radially of the core axis, each space between adjacent bars receiving an active side of an armature coil; a plate having a plurality of cam slots cooperating with the bars to move the latter toward the core upon relative rotation between the plate and the frame whereby the spaces between the bars become narrower and the coil sides therein are squeezed; means for causing such relative rotation; a plurality of bars mounted on the frame alternately intermediate the first mentioned bars for movement radially of the core axis; another plate having a plurality of cam slots cooperating with the last mentioned bars to move the same toward the core upon relative rotation between said other plate and the frame in order to eject the squeezed coil sides from the mentioned spaces into core slots.

21. A machine for assembling armatures for dynamo electric machines comprising, in combination, means for holding an assembly including a slotted armature core and a plurality of armature coils, one active coil side of each having been positioned in a core slot and the other active coil side of each being free; a rotatable frame; a plurality of angularly spaced bars mounted on the frame for movement radially of the core axis, each space between adjacent bars receiving the free active side of a coil; a plate having a plurality of cam slots cooperating with the bars to move the latter toward the core upon rotation of the frame in a certain direction relative to said plate whereby the spaces between the bars become narrower and the coil sides therein are squeezed; means for rotating the frame in said certain direction relative to the plate in order simultaneously to displace the free active coil sides angularly relative to the core and to align the same with the core slots; a plurality of bars mounted on the frame alternately intermediate the first mentioned bars for movement radially of the core axis; another plate having a plurality of cam slots cooperating with the last mentioned bars to move the same toward the core upon relative rotation between said other plate and the frame in order to eject the squeezed coil sides from the mentioned spaces into the aligned core slots; and means for causing such relative rotation.

22. A machine for assembling armatures for dynamo electric machines comprising, in combination, means for holding an assembly including a slotted armature core and a plurality of armature coils, one active coil side of each having been positioned in a core slot and the other active coils side of each being free; a rotatable frame; a plurality of angularly spaced bars mounted on the frame for movement radially of the core axis, each space between adjacent bars receiving the free active side of a coil; a plate having a plurality of cam slots cooperating with the bars to move the latter toward the core upon rotation of the frame in a certain direction relative to said plate whereby the spaces between the bars become narrower and the coil sides therein are squeezed; means for rotating the frame in said certain direction relative to the plate in order simultaneously to displace the free active coil sides angularly relative to the core and to align the same with the core slots; a plurality of bars mounted on the frame alternately intermediate the first mentioned bars for movement radially of the core axis; and another plate rotatable concentrically of the frame and having a plurality of cam slots cooperating with the last mentioned bars to move the same toward the core upon rotation of said other plate relative to the frame in order to eject the squeezed coil sides from the mentioned spaces into the aligned core slots.

23. A machine for assembling armatures for dynamo electric machines comprising, in combination, means for holding an assembly including a slotted armature core and a plurality of armature coils, one active coil side of each having been positioned in a core slot and the other active coil side of each being free; a rotatable frame; a plurality of angularly spaced bars mounted on the frame for movement radially of the core axis, each space between adjacent bars receiving the free active side of a coil; a plate rotatable concentrically of the frame and having a plurality of cam slots cooperating with the bars to move the latter toward the core upon rotation of the frame through a predetermined cycle in a certain direction relative to the plate whereby the spaces between the bars become narrower and the coil sides therein are squeezed; means for rotating the frame in said certain direction relative to the plate in order simultaneously to displace all free active coil sides angularly relative to the core and to align the same with the core slots; means arresting the plate after a complete rotation of the frame through said predetermined cycle and in said certain direction only; a plurality of bars mounted on the frame alternately intermediate the first mentioned bars for movement radially of the core axis; and another plate rotatable concentrically of the frame and having a plurality of cam slots cooperating with the last mentioned bars to move the same toward the core upon rotation of said other plate relative to the frame in order to eject the squeezed coil sides from the mentioned spaces into the aligned core slots.

24. A machine for assembling armatures for dynamo electric machines comprising, in combination, means for holding an assembly including a slotted armature core and a plurality of armature coils, one active coil side of each having been positioned in a core slot and the other active coil side of each being free; a rotatable frame; a plurality of angularly spaced bars having lateral projections and being mounted on the frame for movement radially of the core axis, each space between adjacent bars receiving the free active side of a coil; a plate rotatable concentrically of the frame and having a plurality of cam slots receiving the projections of the bars and moving the bars toward the core upon rotation of the frame in a certain direction relative to the plate until the bar projections engage end walls of the cam slots whereby the spaces between the bars become narrower and the coil sides therein are squeezed; means for rotating the frame in said certain direction in order simultaneously to displace all free active coil sides angularly relative to the core; means arresting the plate only until the bar projections arrive adjacent said end walls of the cam slots; stationary means stopping rotation of the plate in said certain direction in a position in which the bars align the squeezed coil sides with the core slots when the bar projections engage said end walls of the cam slots; and means for simultaneously ejecting all squeezed coil sides from the mentioned spaces into the aligned core slots.

25. A machine for assembling armatures for dynamo electric machines comprising, in combination, means for holding a slotted armature core; a pair of angularly spaced bars mounted for movement toward or away from the core; the space between the bars receiving an active side of an armature coil; means for simultaneously moving both bars toward the core whereby the space between the bars becomes narrower and the coil side therein is squeezed; and means for ejecting the squeezed coil side from the mentioned space into a core slot.

26. A machine for assembling armatures for dynamo electric machines comprising, in combination, means for holding a slotted armature core; a pair of angularly spaced bars mounted for movement radially of the core axis, the space between the bars receiving an active side of an armature coil; means for simultaneously moving both bars toward the core whereby the space between the bars becomes narrower and the coil side therein is squeezed; and means for ejecting the squeezed coil side from the mentioned space into a core slot.

27. A machine for assembling armatures for dynamo electric machines comprising, in combination, means for holding a slotted armature core; a pair of angularly spaced bars mounted for movement radially of the core axis, the space between the bars receiving an active side of an armature coil; means for simultaneously moving both bars toward the core whereby the space between the bars becomes narrower and the coil side therein is squeezed; and another bar mounted intermediate the first mentioned bars for movement radially of the core and adapted to eject the squeezed coil side from the mentioned space into a core slot upon movement of said other bar toward the core.

28. A machine for assembling armatures for dynamo electric machines comprising, in combination, means for holding a slotted armature core; a pair of angularly spaced bars mounted for movement toward or away from the core periphery, adjacent surfaces of said bars defining a space for receiving an active side of an armature coil, said surfaces being so coordinated that in the position of both bars adjacent the core periphery the space is of a substantially uniform width; means for moving the bars simultaneously adjacent the core periphery whereby the space between the bars becomes narrower and the coil side therein is squeezed; and means for ejecting the squeezed coil side from the mentioned space into a core slot.

29. A machine for assembling armatures for dynamo electric machines comprising, in combination, means for holding a slotted armature core; a pair of angularly spaced bars mounted for movement radially of the core axis, adjacent surfaces of said bars being substantially parallel and defining a space for receiving an active side of an armature coil, said surfaces being so coordinated that in the position of both bars adjacent the core periphery the space is of a width which is substantially equal to that of a core slot entrance; means for moving both bars simultaneously adjacent the core periphery whereby the space between both bars becomes narrower and the coil side therein is squeezed; and means for ejecting the squeezed coil side from the mentioned space into a core slot.

30. A machine for assembling armatures for dynamo electric machines comprising, in combination, means for holding a slotted armature core; a pair of angularly spaced bars mounted for movement radially of the core axis, adjacent surfaces of said bars being flat and parallel and defining a space for receiving an active side of an armature coil, said surfaces being so coordinated that in the position of both bars adjacent the core periphery, a plane intermediate both surfaces and parallel thereto extends through the core axis; means for moving both bars simultaneously adjacent the core periphery whereby the space between the bars becomes narrower and the coil side therein is squeezed; and means for ejecting the squeezed coil side from the mentioned space into a core slot.

ALVA W. PHELPS.
LEWIS G. MALONE.